H. GALE.

PLOW-JOINTER.

No. 6,824. Reissued Dec. 28, 1875.

Witness:
Edward Barthel.
Wm. P. Spalding

Inventor:
H. Gale
By Atty
Thos. S. Sprague

N. PETERS, PHOTO-LITHOGRAPHER, WASHINGTON, D. C.

UNITED STATES PATENT OFFICE.

HORATIO GALE, OF ALBION, MICHIGAN, ASSIGNOR TO THE GALE MANUFACTURING COMPANY.

IMPROVEMENT IN PLOW-JOINTERS.

Specification forming part of Letters Patent No. 147,629, dated February 17, 1874; reissue No. 6,824, dated December 28, 1875; application filed December 8, 1875.

*To all whom it may concern:*

Be it known that I, HORATIO GALE, of Albion, in the county of Calhoun and State of Michigan, have invented an Improvement in Attachments to Plows, of which the following is a specification:

The nature of this invention relates to improvements in the attachment of jointers to the standards of plows; and consists, principally, in the construction and arrangement of the various parts so that the same are more readily adjusted vertically.

Figure 1:
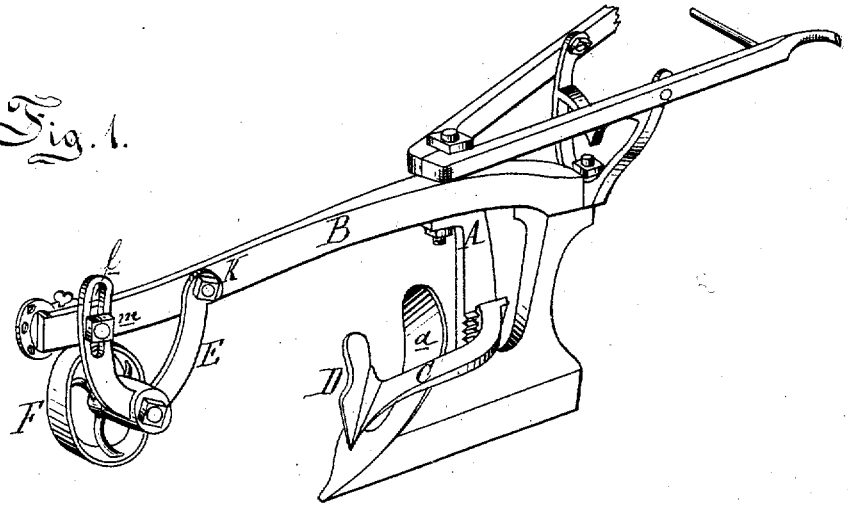
Figure 2:
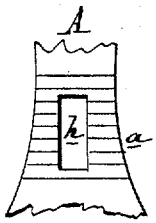
Figure 3:
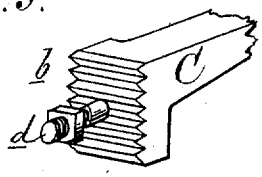

Figure 1 is a perspective view of my attachments in place on the plow. Fig. 2 is a sectional elevation of the standard where the jointer is attached. Fig. 3 is a perspective view of the end of the arm by means of which the jointer is secured to the standard.

Like letters refer to like parts in each figure.

In the drawing, A represents the standard of the plow, to which the land-side and mold-board are attached, and by which they are secured to the beam B. The side of this standard is provided with serrations *a*, which engage with similar serrations *b* on the adjacent end of the curved arm C, which is also provided with a bolt, *d*, which passes through the slot *h* in the standard, where it is secured by a proper nut. By these means the arm can be raised or lowered, as may be necessary, carrying with it the jointer or small plow D. This arm is curved, as shown, in order to bring the jointer into its proper position over the plow-point to readily cut the sward. E is a curved arm, pivoted to the beam at *k*, as shown, with its other end provided with a slot, *l*, through which a bolt, *m*, and suitable nut secure said arm to the beam. This arm is provided with a wrist-pin, upon which the wheel F rotates, as shown.

The depth of the furrow will be governed by the wheel, which is adjustable vertically, as described, when the jointer may be correspondingly adjusted to cut the sward by the devices described.

One great object in attaching the jointer to the standard by a curved arm instead of to the beam is to prevent clogging up by stubble and weeds, which occurs by the use of a vertical standard or arm which holds the jointer from the beam.

What I claim as my invention is—

1. In combination with the standard of a plow, a horizontally-projecting arm carrying a jointer, for the purposes set forth.

2. In combination with a serrated standard, A, the curved arm C, carrying the jointer D, substantially as and for the purposes set forth.

3. The combination, with a plow-standard, of the jointer D, having arm C, and vertically adjustable upon said standard, substantially as described.

HORATIO GALE.

Witnesses:

J. HYDE MONROE,

W. J. WALKER.